United States Patent [19]
Difloe et al.

[11] Patent Number: 5,585,161
[45] Date of Patent: Dec. 17, 1996

[54] BOND SITE REINFORCEMENT IN THERMAL BONDED HIGHLOFT NON-WOVENS

[76] Inventors: Donna M. Difloe, 1225 Lake Charles Dr., Roswell, Ga. 30075; Thomas E. Taylor, 1218 Beechdale Dr., Charlotte, N.C. 28212

[21] Appl. No.: 150,761

[22] Filed: Nov. 12, 1993

Related U.S. Application Data

[63] Continuation of Ser. No. 823,880, Jan. 22, 1992, abandoned.

[51] Int. Cl.⁶ ............................... B32B 5/12; B32B 7/00; D04H 1/58
[52] U.S. Cl. ........................ 428/109; 428/156; 428/171; 428/247; 428/253; 428/255; 428/283; 428/284; 428/288; 428/293; 428/294; 428/296; 428/297
[58] Field of Search ............................... 428/247, 253, 428/283, 284, 288, 296, 109, 156, 171, 255, 293, 294, 297

[56] References Cited

U.S. PATENT DOCUMENTS

| | | | |
|---|---|---|---|
| 3,616,031 | 10/1971 | Fieissner | 428/280 |
| 3,765,997 | 10/1973 | Dunning | 428/293 |
| 3,816,228 | 6/1974 | Stumpf | 161/63 |
| 4,783,355 | 11/1988 | Mueller | 428/43 |
| 4,820,575 | 4/1989 | Kolzer | 428/240 |
| 4,855,177 | 8/1989 | Leis | 428/247 |
| 4,914,772 | 4/1990 | Difloe | 428/76 |
| 4,992,327 | 2/1991 | Donovan et al. | 428/296 |
| 5,023,131 | 6/1991 | Kwok | 428/288 |

*Primary Examiner*—Asok Pal
*Assistant Examiner*—Kathryne E. Shelborne

[57] ABSTRACT

Provided is a supplement or additive to thermal bonded highloft nonwoven fiber masses bonded by the fusion of a matrix fiber and a heat reactive binder. The purpose of the supplement or additive is to reinforce and enhance the bonded fiber structure. The supplement is in the form of an embedment or filler.

10 Claims, 4 Drawing Sheets

BOND SITE REINFORCEMENT IN THERMAL BONDED HIGHLOFT NON-WOVENS

This application is a continuation of application Ser. No. 07/823,880 filed Jan. 22, 1992, now abandoned.

BACKGROUND OF THE INVENTION

A polyester fiber is a synthetic material. Polyester fibers are commonly used in the upholstered furniture industry as a filling component for seat and back cushions and/or as batting or padding of vertical and horizontal interior surfaces. Polyester fibers have replaced such previously used filling materials such as cotton and animal hair battings. Polyester is the dominant staple fiber used today for non-woven flatgoods, highloft and densified synthetic textile applications.

Many companies currently produce synthetic filament and staple products. As an example, two companies and their common brand names for these synthetic fibers are DuPont DACRON™ (also, DuPont HOLLOFIL™) and Hoechst Celanese TREVIRA™. Other types of recognized staple fiber are polypropylene and rayon. As used herein, "staple" is fiber that is graded as to length and fineness (denier).

Polyester fibers are hair-like strands wherein the strands are generally solid fibers. However, with at least one type, HOLLOFIL™, hollow fibers are employed. When used for furniture seating applications, these fibers are processed into batting or filling using conventional methods such as garnetting or carding. In addition, synthetic fibers can also be "blown in" to a fabric casing, such as one used for a back cushion. "Bonding" is a conventional term of art, and, as used herein, describes a method of holding strands of fibers together in a practical and workable manner with the intention of creating a desired shape or form. Two examples of known types of bonding include resin bonding, which is characterized by its use of glues, and thermal bonding, which is characterized by its use of heat. Thermal bonding is preferred when drainage of liquid is an important consideration because resins impede the downward movement of liquids through the cushion, as will be discussed specifically below. In the textile product industry and as used herein, the term thermal bonding refers to a bonding technique which particularly utilizes a low-melt bicomponent binder.

A thermal bonded, densified fiber product can be manufactured into a variety of different textile products. Several such products relate to upholstered cushions or to cushion fillers, including the recently developed all-fiber seating filling components. Such a configuration can eliminate the use of a foam fill material. As previously stated, a thermal bonded all-fiber core or core/wrap combination encourages the downward movement of liquid through the textile product.

The self-draining properties of the all-fiber configurations provide a significant advantage over existing foams and resin-bonded fibers. The use of glues in these existing configurations blocks the flow of liquid. Flow-through movement of liquids (especially water) in cushion fillers as enabled by an all-fiber filler, is integral to the finished drainable cushion system (U.S. Pat. Nos. 4,914,772 and 5,005,241). Some common environments where the self-draining capabilities of all-fiber products are beneficial include upholstered indoor/outdoor furniture seating, marine seating, and sleep products.

Thermal bonded, high-loft, all-fiber filling products, however historically contain no supplemental components to reinforce the thermal bond sites. After repeated use or multiple compressions, the fibers can begin to collapse upon themselves. As the fibers collapse, the loft or resilience of the filling is reduced. Resilience is commonly used criteria to measure the quality of a filling or stuffing. As used herein, resilience is the ability to spring back or return to the original shape after being compressed or depressed by a form of pressure.

The textile industry has attempted a variety of different methods of treating fibers to create more resilience. An adage prevalent throughout the textile industry holds that the more fibers per board foot, the more loft and resilience the product will exhibit. One particular method presently utilized to achieve more fiber content within a given area is a process referred to as thermal bonded densification, which is also often called "densified batting" or DB.

A variety of factors may affect exactly how much resilience or loft a particular filling displays. The contributing factors are whether the fibers are "dry" or siliconized (i.e. "wet"); and the density of the core/core wrap or core-only fiberfill. In addition, it is commonly recognized that there is a quantitative loss in the resilience of the filling or batting after repetitive use. Such a decline in resilience causes the cushion to lose both height and comfort.

Often times with traditional indoor cushions, polyurethane foam is used as a seat core or back fill. Even though foam is also subject to some fatigue or resilience loss after repetitive use, it may exhibit longer-lasting lofting properties than some all-fiber fillings. Futhermore, such foam seat cores may sometimes be supplemented with a type of internal support or springing (Ex: Marshall Units, Flexolator Grids). A mattress, for example, usually contains a type of innerspringing. As stated above, with regard to highloft fibers, however, a resilience or support type component is lacking as a supplement in thermal bonded fillers.

In addition, if a highloft fiber product 10 is made too dense, it becomes hard or does not exhibit a realistic degree of flexibility. Conversely, when made soft, the lack of fiber density allows for bonding site breakage, which reduces load bearing features and allows the fiber to move when compressed, therefore, causing a reduction of loft in the product. Currently, the synthetic fibers 18 utilized in all-fiber, thermal bonded fillers depend only on the matrix fiber 12 as combined with the bicomponent binder fiber 14 at a specified densification to achieve a desired cubic volume. There are no supplemental elements within the all-fiber thermal bonded fillers that serve as bond site fortifiers or reinforcers.

Currently, all-fiber batts 10, wraps, fillers, cores, etc. for high-loft applications may include a crimped polyester matrix fiber 12, a low-melt binder fiber 14 and utilize some type of fiber densifying process to interconnect the two types of fiber. The crimp 16 in the polyester matrix fiber 12 creates an "intermeshing" potential between the two fibers. Due to the presence of the low-melt binder fiber 14, a thermal bonding process may be used to bind the fibers 18 together during a machine densifying process. Such a thermal densification assists in creating more resilience, generally due to the presence of more fiber and fiber binder per given area as compared to a resin-type binder.

In order to achieve thermal bonding (the bonding of fibers 18 by a common heat source, and potentially microwaves), low-melt bicomponent or single component binder fibers, or binder powder, must be fused/joined with matrix fibers 12. The preferred binder, the bicomponent binder fiber 14, is commonly a sheath/core fiber (FIG. 6), with the core pan 20 generally being polyester. The binder 14 may be staple or continuous goods. Specifically, the surrounding sheath part 22 is often referred to as a "low-melting" polymer: When exposed to heat, the bicomponent fiber 14, with its melting characteristic, fuses or melts together with the surrounding matrix fibers 12. For seating/reclining components, as one example, the results can be a block or bait 10, etc., of desired dimension. Thermal bonding is also used for flatgood nonwovens, with different processes and applications involved. Two brands of bicomponent binder fiber are DuPont's Corebond™, and Hoecht Celanese's Celbond™. The present invention is directed at alleviating the above-stated shortcomings of the existing technology.

SUMMARY OF THE INVENTION

Provided is a supplement or additive to thermal bonded highloft nonwoven fiber masses bonded by the fusion of a matrix fiber and a heat reactive binder. The purpose of the supplement or additive is to reinforce and enhance the bonded fiber structure. The supplement is in the form of an embedment or filler.

BRIEF DESCRIPTION OF THE DRAWINGS

Other features of the present invention will be more readily understood from the following detailed description of the specific embodiments thereof when read in conjunction with the accompanying drawings, in which.

DETAILED DESCRIPTION OF THE PREFERRED EMBODIMENT

This invention relates to improvements in highloft, nonwoven bonded fiberfill structures 10, as distinguished over existing technologies by the use of a supplemental incorporation of embedments that act as bond site reinforcement. As stated earlier, this invention improves upon, and solves an inherent weakness of, the recently developed, thermal bonded, highloft (both densified and non-densified) all-fiber fillers. The present invention addresses the reduction in fiber loft frequently and commonly caused by the repeated flexing or compressing of thermal bonded fiber masses.

To date, such cut-to-size fiber fillers 18 contain a low-melt bicomponent binder-fiber 14 (the reactive fiber) and a matrix fiber 12 (the non-reactive fiber). As used herein, as well as throughout the nonwovens manufacturing industry, the phrase matrix fibers refers to those textile fibers that are blended with low-melt binder fibers to form a thermally bonded fabric. In nonwovens manufacture, matrix fibers are those textile fibers that are blended with low-melt binder fibers to form a thermally bonded fabric. Matrix fibers can be of varying lengths, but most are staple fibers. A crimp setting process crimps the strands or extrusions. Most strands are currently mechanically crimped in a saw-tooth configuration and are homofilament (of a same composition.) However, these strands, historically a homofilament polyester, can now be homofilament or heterofilament (of a different composition) in nature. Other technology crimpsets reactive heterofilament fibers to form a three-dimensional helix. New technology can now crimp-set homofilament fibers to form a three-dimensional helix. In this art at the present time, the use of the terms homofilament and "homofil" overlap. The present invention introduces an extra component that serves as an internal reinforcement for highloft fiber bond sites. In addition, by acting as a space-filling entity, the extra component improves the resilience and dimensional stability of flexible cushioning.

Figure 1A:
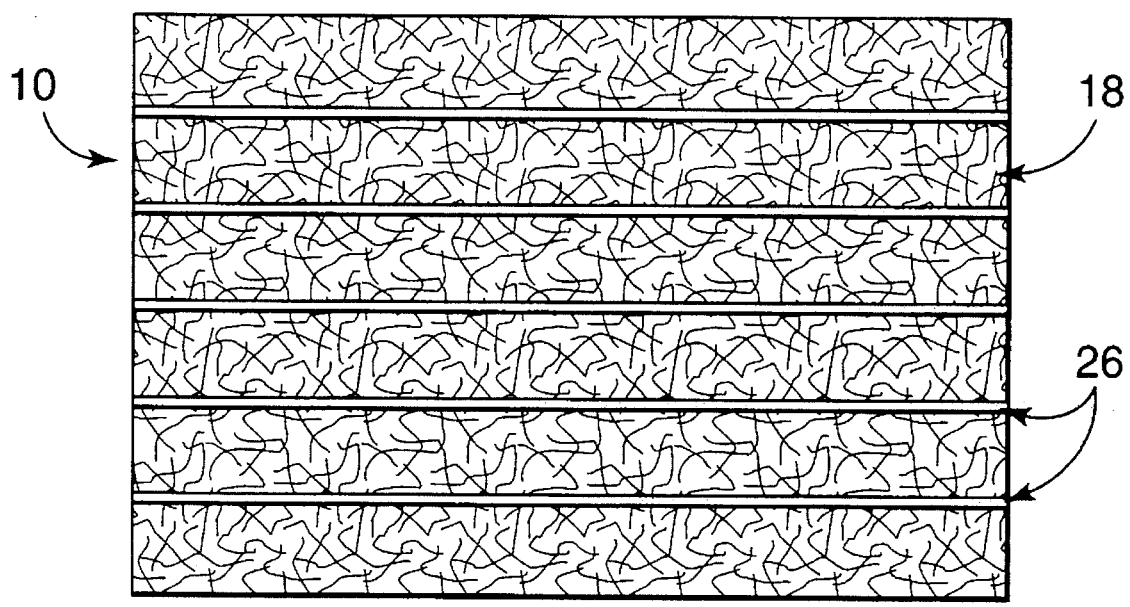
FIG. 1a, b are a downward view of a continuous filament embedment in a thermal bonded nonwoven fiber mass.
Figure 1B:
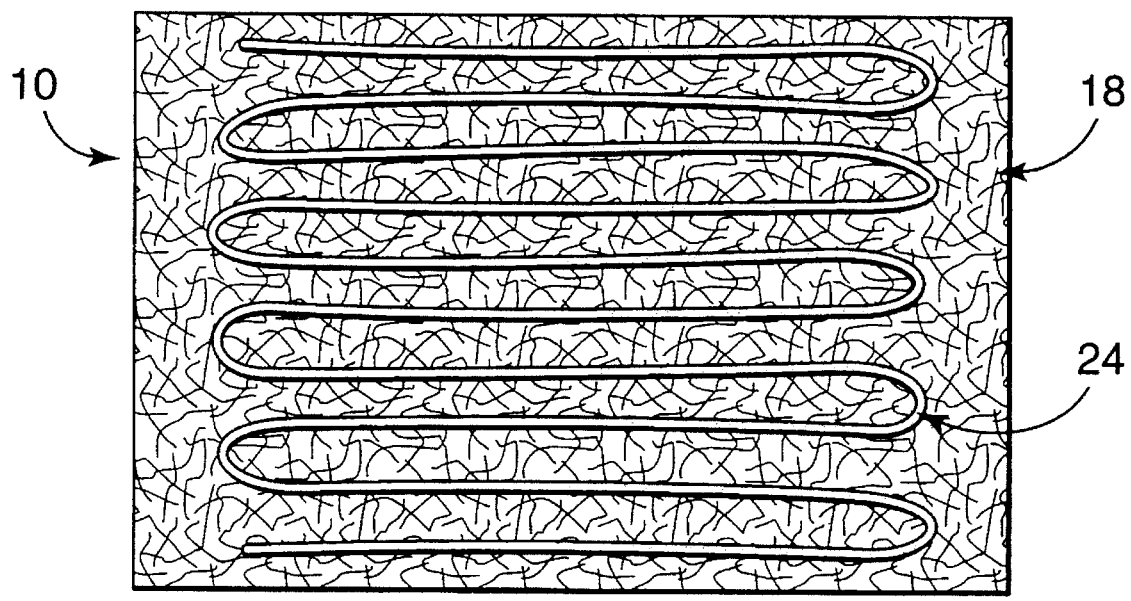

In accordance with the present invention, a supplemental material is introduced into a thermal bonded highloft fiber structure normally comprised of only fiber and binder. Hereinafter, these portions of supplemental material are referred to as "embedments", since the material will be fixed firmly in the surrounding fiber mass. The embedment of choice is a continuous monofilament or multifilament polymer extrusion 24 and 26 (FIGS. 1a and 1b). In addition, another type of acceptable filamentation may be a spun or textured yarn. However, it should be noted that various other materials in numerous configurations may be used as an embedment without varying from the scope of the present invention. For example, other workable materials, include a bead or pellet shaped embedment 28 (FIG. 2) as well as a grid-like mesh 30 (FIGS. 3a and 3b) as an embedment. As an alternative, some synthetic resins 32 (FIG. 4) may be poured into the bonded fiber mass.

Each of the various enhancement components of the present invention, contributes to stability and support in addition to reducing the inherent tendency for fiber collapse. As stated above, these are the main weaknesses in standard or current bond site combinations. When fibers and bonds are indented unevenly, bond sites are weakened, matrix fiber crimps are stretched, and load deflection capacity is impaired. With an embedment however, a load is deflected over a larger area, and the entire batt 10 becomes a load supporting entity. Such distribution of the load also retards the inherent reduction in loft which results from repeated compressions. Thus, the present invention improves the recognized recoil/resilience properties and creates a new type of highloft fiber structure 10. Sustained drainability is also a key result of a textile product utilizing the novel aspects of the present invention.

Figure 2:
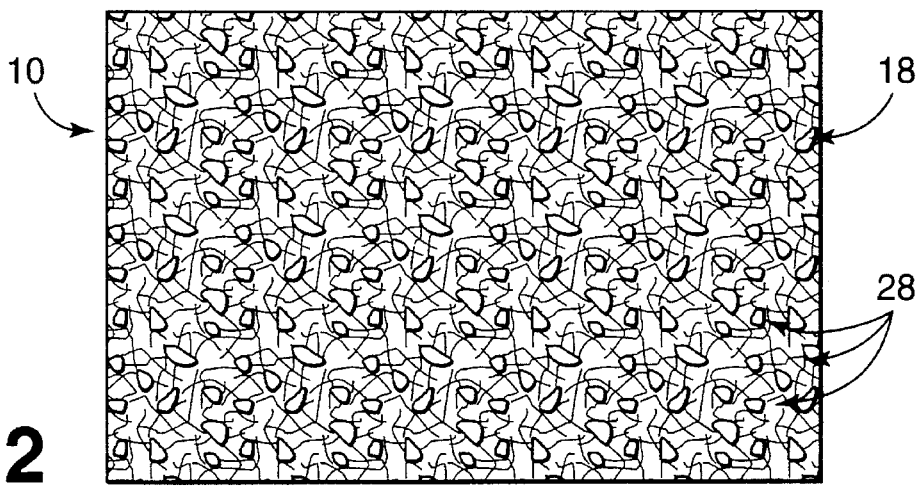
FIG. 2 is a downward view of a piece/pellet embedment in a thermal bonded nonwoven fiber mass.
Figure 3A:
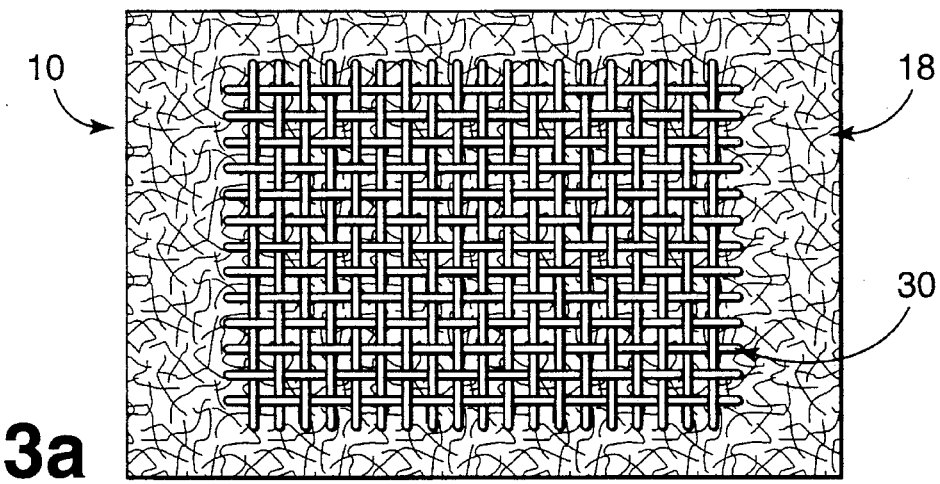
FIG. 3a, b are a downward view of a mesh-type embedment.
Figure 3B:
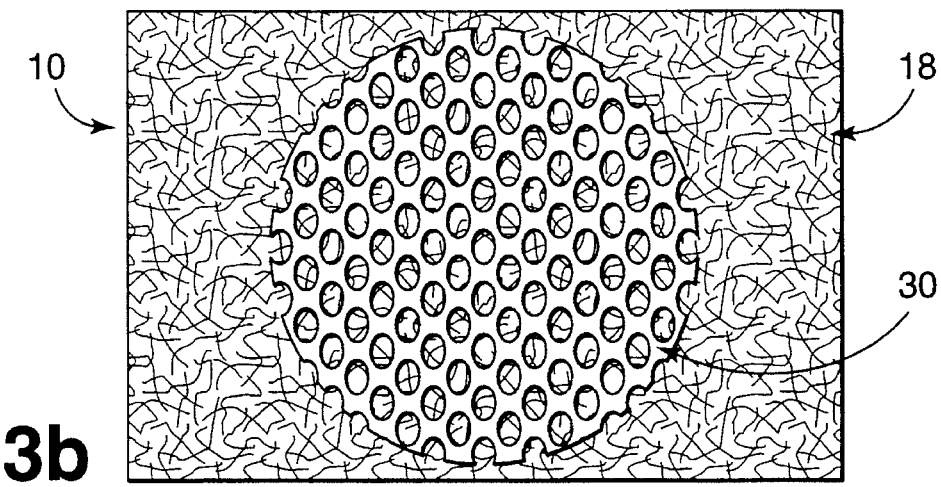
Figure 4:
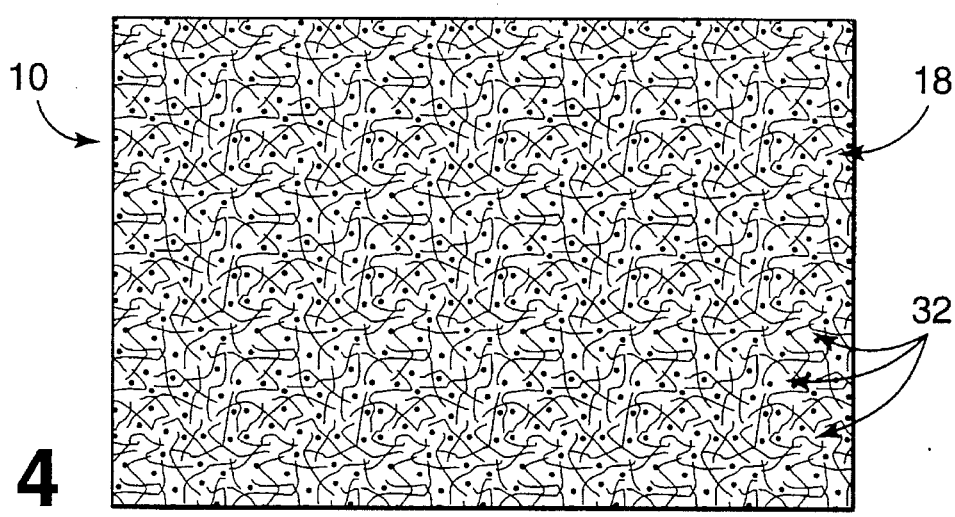
FIG. 4 is a cross-section of a poured resin filler.

As illustrated in FIGS. 1a and 1b, one embodiment of the present invention provides that the embedment take the form of a continuous filament product 24 and 26. This particular embodiment consists of one or more strands of extruded synthetic fibers that continuously wind throughout (or run the length of) the fiber mass/batting 10. In such an arrangement, the continous filament accompanies the bonded matrix fibers. The particle pellet or bead embedment 28 consists of non-fiber pieces that are inserted randomly into the fiber masses 10 (FIG. 2). These pieces can be chipped, chopped, extruded, pelletized, expanded/expanable beaded or molded foam pieces. These pieces are preferably foam, and the foam is preferably polyethylene, polyurethane or polypropylene. Other applicable embedments include other synthetics, or man-made items (such as pulp), as well as metal or wood. The synthetic grid-like mesh embedment 30 is a knitted or extruded product that is layered in the batting (FIG. 3a and 3b).

Figure 5:
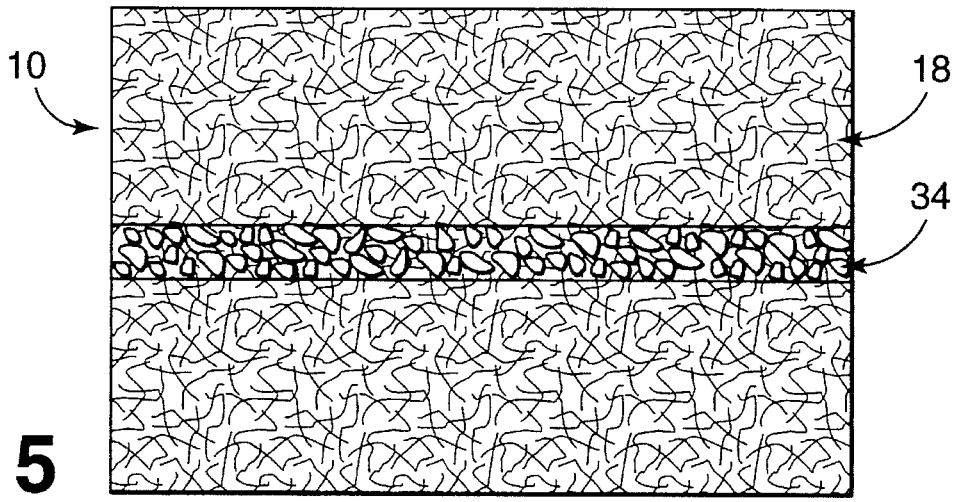
FIG. 5 is a cross-section of an embedment layer in two crosslapped fiber layers.
Figures 6, 9:
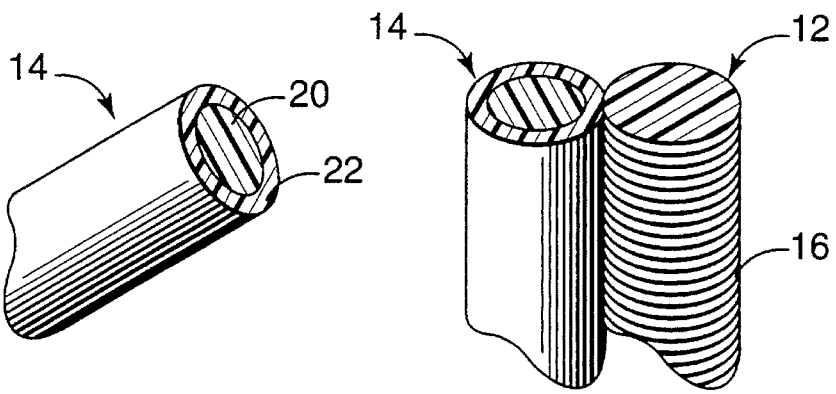
FIG. 6 is a cross-section of a low-melt, bicomponent binder fiber, showing the sheath and core sections.
FIG. 9 is an embodiment of a bicomponent binder fiber and a matrix fiber indicating a standard thermal bonded union of sheath-core and non-sheath core fibers.
Figure 7:
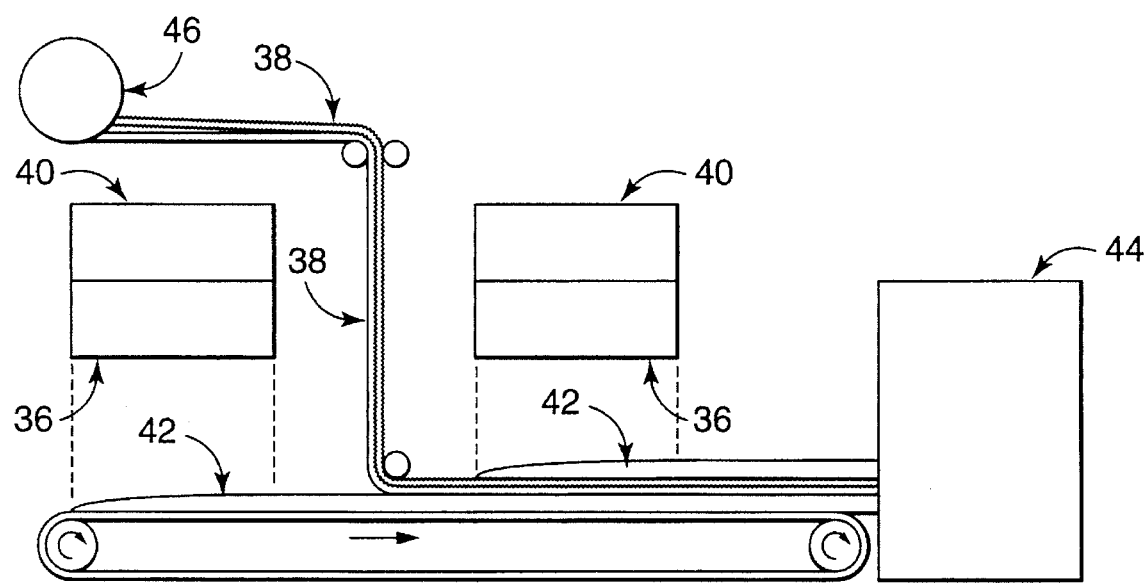
FIG. 7 is a schematic showing the machine processing of continuous filament embedments prior to a thermal bonding stage.
Figure 8:
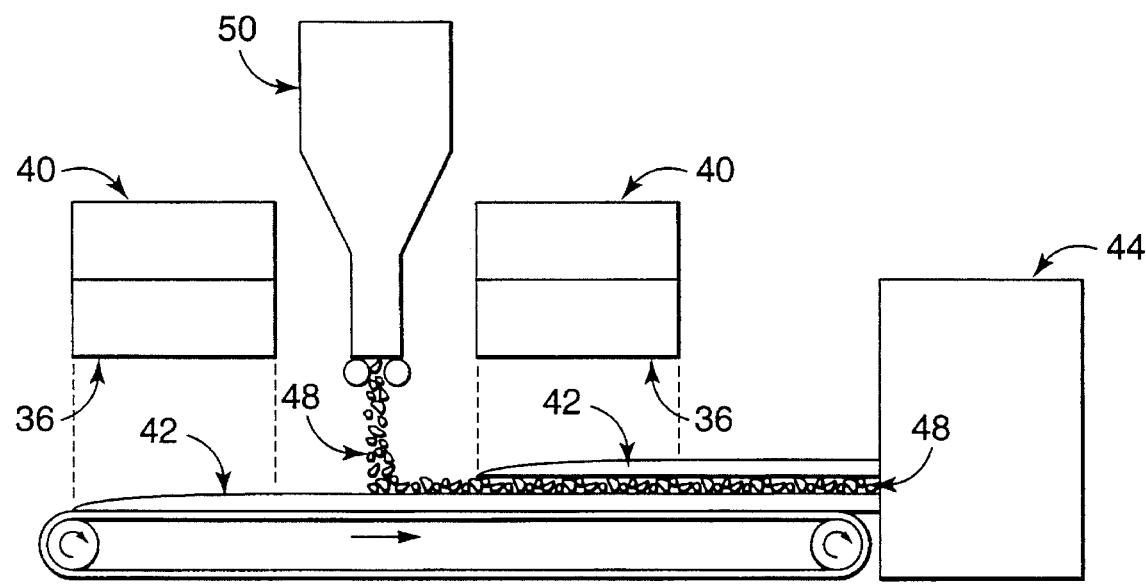
FIG. 8 is a schematic showing the machine processing of metered, dispensed, or poured embedments prior to a thermal bonding stage.

In the preferred embodiment of the present invention as shown in FIG. 5, the bond site reinforcing embedments 34 are inserted during the crosslapping process 36 (FIGS. 7 and 8) after the blend of matrix fiber has been garnetted or carded 40 and before the entrance of the fiber web 42 into the bonding range 44. The continuous filament 38 is introduced into the process by means of a creel, warp or other equivalent system 46 designed to provide a continuous delivery of filament products (see FIG. 7). As stated above, the sized pieces or objects 48 are added prior to the bonding process and after the garnetting or carding process 40. Specifically, these pieces are added by means of a metering system 50 particularly designed to dispense pieces of similar size and density. The dispensing system 50 will meter and deliver the pieces to the crosslapped or line batts (webbs) creating a composite nonwoven fabric structure (see FIG. 8).

As the embedments and layers of matrix fiber enter the bonding process, the combination of pressure and the thermal bonding process causes the matrix fiber, the embedment and the binding agent to become a unified, flexible, high-strength, highloft nonwoven fabric. A variety of methods may be employed to generate and apply the desired pressure. A few of the acceptable methods deemed to be within the scope of the present invention include mechanical pressure, vacuum pressure or the force of gravity.

The embedments of the present invention act as reinforcing agents, enhance and protect the bond sites formed in the bonding process and allow the creation of a highloft, nonwoven fabric structure which exhibits superior strength and performance characteristics over presently available thermal bonded products.

The reinforcements are normally lightweight, sometimes expandable and/or intumescent, blendable, usually of thermosetting plastics or of thermoplastic materials, weather resistant, and water and chemical resistant. Non-polymer inserts, such as metal, also have application. Embedment reinforcement is intended for any products using synthetic fiberfills in what is commonly recognized as highloft configuration (normally identified as a higher than 22 millimeters, definitely higher than recognized flatgoods). These reinforced fiber masses are a new an improved replacement for conventional polyurethane foam fillers, and an even greater improvement over the highloft nonwoven fiberfills. This reinforced product has immediate application in geotextile, filtration, seating, bedding, cushioning and building products use.

While the above description contains many specificities, these should not be construed as limitations on the scope of the invention, but rather as an amplification of a preferred embodiment thereof. For example, other products relating to seating/support/filling/shock absorbency incorporating the principles set forth herein are envisioned. Buoyancy and insulating characteristics are two additional product intentions. And, although this device is being developed for thermal bonded and den sifted processes, it could be applicable for molded structures and non-densified ones as well. It can be reactive or non-reactive, flexible or rigid.

What is claimed is:

1. A highloft nonwoven thermally bonded fiber batting consisting essentially of:

a series of matrix fibers;

at least one binder element comprising at least one low-melt, sheath-core binder fiber and which secures the matrix fibers together to establish a desired textile structure: and at least one supplemental reinforcing element positioned throughout the established textile structure in a manner that assists in maintaining it's structural integrity and loft even after exposure to multiple compressions, wherein the supplemental reinforcing element comprises at least one medially located, planar textile component formed of single or multiple filaments, fibers or yarns.

2. The fiber batting of claim 1 wherein the textile component of the supplemental reinforcing element is formed by interlacing.

3. The fiber batting of claim 2 wherein the textile component of the supplemental reinforcing element has a mesh-like configuration.

4. The fiber batting of claim 1 wherein the textile component of the supplemental reinforcing element is formed by extrusion.

5. The fiber batting of claim 4 wherein the textile component of the supplemental reinforcing element has a mesh-like configuration.

6. The fiber batting of claim 1 wherein the textile component of the supplemental reinforcing element has a lineal orientation.

7. The fiber batting of claim 6 wherein the textile component of the supplemental reinforcing element comprises cut lengths.

8. The fiber batting of claim 6 wherein the textile component of the supplemental reinforcing element is continuous.

9. The fiber batting of claim 1 wherein the textile component of the supplemental reinforcing element is formed by a knitting process.

10. The fiber batting of claim 1 wherein the textile component of the supplemental reinforcing element is a nonwoven fabric.

* * * * *